US008451926B2

(12) United States Patent
Cheng et al.

(10) Patent No.: US 8,451,926 B2
(45) Date of Patent: May 28, 2013

(54) METHOD AND DEVICE FOR PRE-CODING IN MULTIPLE INPUT MULTIPLE OUTPUT SYSTEM

(75) Inventors: Jinxia Cheng, Beijing (CN); Hong He, Beijing (CN); Zongchuang Liang, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 390 days.

(21) Appl. No.: 12/747,016

(22) PCT Filed: Dec. 26, 2008

(86) PCT No.: PCT/KR2008/007711
§ 371 (c)(1),
(2), (4) Date: Jun. 9, 2010

(87) PCT Pub. No.: WO2009/084876
PCT Pub. Date: Jul. 9, 2009

(65) Prior Publication Data
US 2010/0266061 A1 Oct. 21, 2010

(30) Foreign Application Priority Data
Dec. 28, 2007 (CN) .......................... 2007 1 0307834

(51) Int. Cl.
*H04B 7/02* (2006.01)
(52) U.S. Cl.
USPC ....................................................... 375/267
(58) Field of Classification Search
None
See application file for complete search history.

(56) References Cited

U.S. PATENT DOCUMENTS

| 7,676,007 B1 * | 3/2010 | Choi et al. ..................... 375/347 |
| 2004/0013180 A1 | 1/2004 | Giannakis et al. |
| 2004/0178954 A1 * | 9/2004 | Vook et al. ..................... 342/383 |
| 2006/0039489 A1 * | 2/2006 | Ikram et al. ................... 375/260 |
| 2008/0049709 A1 * | 2/2008 | Pan et al. ....................... 370/344 |
| 2008/0108310 A1 * | 5/2008 | Tong et al. ....................... 455/69 |
| 2008/0192853 A1 * | 8/2008 | Kent et al. ..................... 375/262 |
| 2011/0268222 A1 * | 11/2011 | Khojastepour ............... 375/295 |

FOREIGN PATENT DOCUMENTS

| KR | 10-2003-0007481 A | 1/2003 |
| KR | 10-2007-0043880 A | 4/2007 |
| WO | 2004/077730 A2 | 9/2004 |
| WO | 2006/069271 A2 | 6/2006 |

OTHER PUBLICATIONS

"Interpolation Based Unitary Precoding for Spatial Multiplexing MIMO-OFDM with Limited Feedback", Jihoon Choi, Bishwarup Mondal, and Robert W. Heath, Jr., IEEE Transactions on Signal Processing, vol. 54, No. 12, Dec. 2006.*
"Limited Feedback Unitary Precoding for Spatial Multiplexing Systems", David J. Love, and Robert W. Heath, IEEE Transactions on Information Theory, vol. 51, No. 8, Aug. 2005.*

* cited by examiner

*Primary Examiner* — Daniel Washburn
*Assistant Examiner* — Bahman Badipour
(74) *Attorney, Agent, or Firm* — Jefferson IP Law, LLP

(57) ABSTRACT

A signal processing method in an MIMO multi-carrier system is disclosed comprising: receiving by a receiver signals of a plurality of sub-carriers transmitted from a transmitter; dividing the sub-carriers into a plurality of sub-carrier blocks according to the correlation between adjacent sub-carriers, each sub-carrier block containing K sub-carriers; selecting a feedback sub-carrier pre-coding matrix ( ) and a rotation matrix ( ) for each sub-carrier block, and then sending the information on the pre-coding matrix and the rotation matrix back to the transmitting end. The present invention provides the method and device for effectively settling the feedback problem in an MIMO/OFDMA system, thereby greatly reducing the number of pre-coding weight matrices needed to feed back to the transmitting device.

15 Claims, 9 Drawing Sheets

| INDEX OF PRE-CODING MATRIX 1 | INDEX OF ROTATION MATRIX 1 | INDEX OF PRE-CODING MATRIX 2 | INDEX OF ROTATION MATRIX 2 | INDEX OF PRE-CODING MATRIX 3 | INDEX OF ROTATION MATRIX 3 |
|---|---|---|---|---|---|

FIG.9

METHOD AND DEVICE FOR PRE-CODING IN MULTIPLE INPUT MULTIPLE OUTPUT SYSTEM

BACKGROUND OF THE INVENTION

1. Field of Invention

The present invention relates to an MIMO (Multiple Input Multiple Output) OFDM (orthogonal frequency division multiplexing) system, in particular to a signal processing method and device in an MIMO multi-carrier system.

2. Description of Prior Art

In a multi-antenna MIMO wireless communication system, the receiving end and the transmitting end can support a plurality of independent wireless channels with the same bandwidth in fully scattered environment. Therefore, system capacity can be effectively improved, which is useful in settling the problem of capacity bottleneck for future wireless communications. In many real-world applications, as shown in FIG. 1, channel parameters can be obtained over a low rate feedback channel between the receiving end and the transmitting end. With this feedback information, pre-coding can be implemented on transmitted data in the transmitter, so that a greater gain can be obtained in the receiving end to improve the entire system's reliability and the communication distance.

FIG. 2 illustrates a specific MIMO solution implemented in an orthogonal frequency division multiplexing (OFDM) system. The transmitter 102 uses multiple antennas to transmit a plurality of data streams to one or more receiving devices 101 by a plurality of OFDM sub-carriers. S(K) denotes the plurality of data streams, where K ($1 \leq K \leq N$) represents the sub-carrier index, N denotes the number of sub-carriers, $N_s$ indicates the number of data streams on each sub-carrier, and $N_s \geq 1$. For example, data streams on sub-carrier 1 can be denoted as:

$$S(1)=[S_1(k=1), S_2(k=1), \ldots, S_{N_s}(k=1)]$$

The data streams on each sub-carrier is mapped to a new set of data streams X(K) through the pre-coding generator 105:

$$X(K)=V(K)S^T(K), X(K)=\{X_1(k=K), X_2(k=K), \ldots, X_{Tx}(k=K)\}^T$$

X(K) are fed into Tx transmitting antennas 104, and each signal is generated through IDFT (inverse discrete Fourier transform) 107, cyclic prefix insertion and serial-to-parallel converter 106. In FIG. 2, V(K) denotes a precoding matric for subcarrier K.

FIG. 3 shows pre-coding symbol generators 105 in greater detail, which function before each sub-carrier input of the $T_x$ IDFTs 107 in the transmitting device 102. As shown in FIG. 3, an MIMO pre-coding matrix represented by a Tx×Ns matrix $V(K)=\{v_1(K), v_2(K), \ldots, v_{N_s}(K)\}$ is used by each of the pre-coding symbol generators 105 in the transmitting device 102 for weighting. Here, $T_x$ indicates the number of transmitting antennas. To obtain the value of V(K), the transmitting device 102 needs the response information on channel(s) between the transmitting antennas 104 and one or more receiving antennas in the receiving device 101.

As can be seen from FIGS. 1-3, the transmitter 102 of the system needs to know the matrix frequency response between the transmitting and the receiving arrays, which gives rise to trouble in the case of fast varying frequency selection broadband channels, such as the type of channels in an OFDM (OFDMA) mobile communication system. In more detail, in the feedback-based MIMO system illustrated in FIG. 1, it is necessary to feed the pre-coding weighting matrix back to the transmitter 102 and update it, in order to keep track of channel variations spanning over time and frequency for optimal performance. However, mechanisms allowing complete track of channel response may require feedback of forbidden level between the receiving device and the transmitting device. Therefore, a method and device for MIMO transmission in a communication system is required, in which no feedback of forbidden level is required when channel information to be used by the transmitting device is sent back to the transmitting device.

At present, the problem of feedback in an MIMO OFDM/OFDMA system is a hot spot in research by such standardization organizations as the 3GPP LTE, the WiMAX, the WiBro and so on. There is no definite and ultimate solution in current protocols or specifications.

SUMMARY OF THE INVENTION

In view of the problems in existing solutions, a method and device is proposed in present invention to effectively address the problem of feedback in an MIMO OFDM/OFDMA system. In present invention, correlation between sub-carrier channel responses in an MIMO OFDM/OFDMA system is used to greatly reduce the number of pre-coding weight matrices to be fed back to transmitting device. Special processing is applied in the transmitting end to recover the pre-coding matrix for each sub-carrier for downlink data transmission.

Thus, the object of the present invention is to provide a method and device to effectively reduce the feedback amount in an MIMO OFDM/OFDMA system. With this method and device, the existence of forbidden level feedback in the system can be effectively avoided while meeting the system performance requirements.

According to one aspect of the present invention, a signal processing method in an MIMO multi-carrier system is provided comprising:

receiving by a receiver signals of multiple sub-carriers transmitted from a transmitter;

dividing the sub-carriers into a plurality of sub-carrier blocks according to the correlation between adjacent sub-carriers, each sub-carrier block containing K sub-carriers;

selecting a feedback sub-carrier pre-coding matrix (F(i)) and a rotation matrix (Q(i)) for each sub-carrier block i, and then sending the information on the pre-coding matrix and the rotation matrix back to the transmitting end.

According to another aspect of the present invention, a signal processing device at a transmitting end is provided comprising:

a receiving device for receiving information fed back from a receiving end;

an ensemble memory for storing a quantized matrix ensemble;

a pre-coding matrix processor for calculating a plurality of pre-coding matrices $V_c$ according to the received feedback information and the matrix ensemble saved in the ensemble memory and outputting the calculated pre-coding matrices $V_c$, wherein the calculation includes calculating a pre-coding matrix for each sub-carrier.

According to another aspect of the present invention, a signal processing device at a receiving end is provided comprising:

an ensemble memory for storing a quantized matrix ensemble;

a channel estimator for estimating channel response at each sub-carrier in frequency domain according to a two-dimensional time-frequency pilot symbol from a transmitting end;

a feedback pre-coding matrix selector for dividing the sub-carriers into a plurality of sub-carrier blocks, calculating information to be fed back to the transmitting end according to the channel response at each sub-carrier in frequency domain estimated by the channel estimator and the matrix ensemble in the ensemble memory, and simultaneously outputting a post-processing matrix (W), wherein only the information on the pre-coding matrix (F) and the rotation matrix (Q) is fed back for each sub-carrier.

The present invention provides the method and device for effectively settling the feedback problem in an MIMO/OFDMA system, thereby greatly reducing the number of pre-coding weight matrices needed to feed back to the transmitting device. In the transmitting end, special processing is applied to recover the pre-coding matrix for each sub-carrier for downlink data transmission, thereby improve the entire system throughput and communication coverage. For example, the system can be the 3rd generation mobile communication system, WiMAX, Wibro, etc.

BRIEF DESCRIPTION OF THE DRAWINGS

FIG. 9 shows a frame structure of feedback information according to the present invention.

DETAILED DESCRIPTION OF PREFERRED EMBODIMENTS

With reference to the preferred embodiments, the system of the present invention can be structured as follows.

Figure 2:
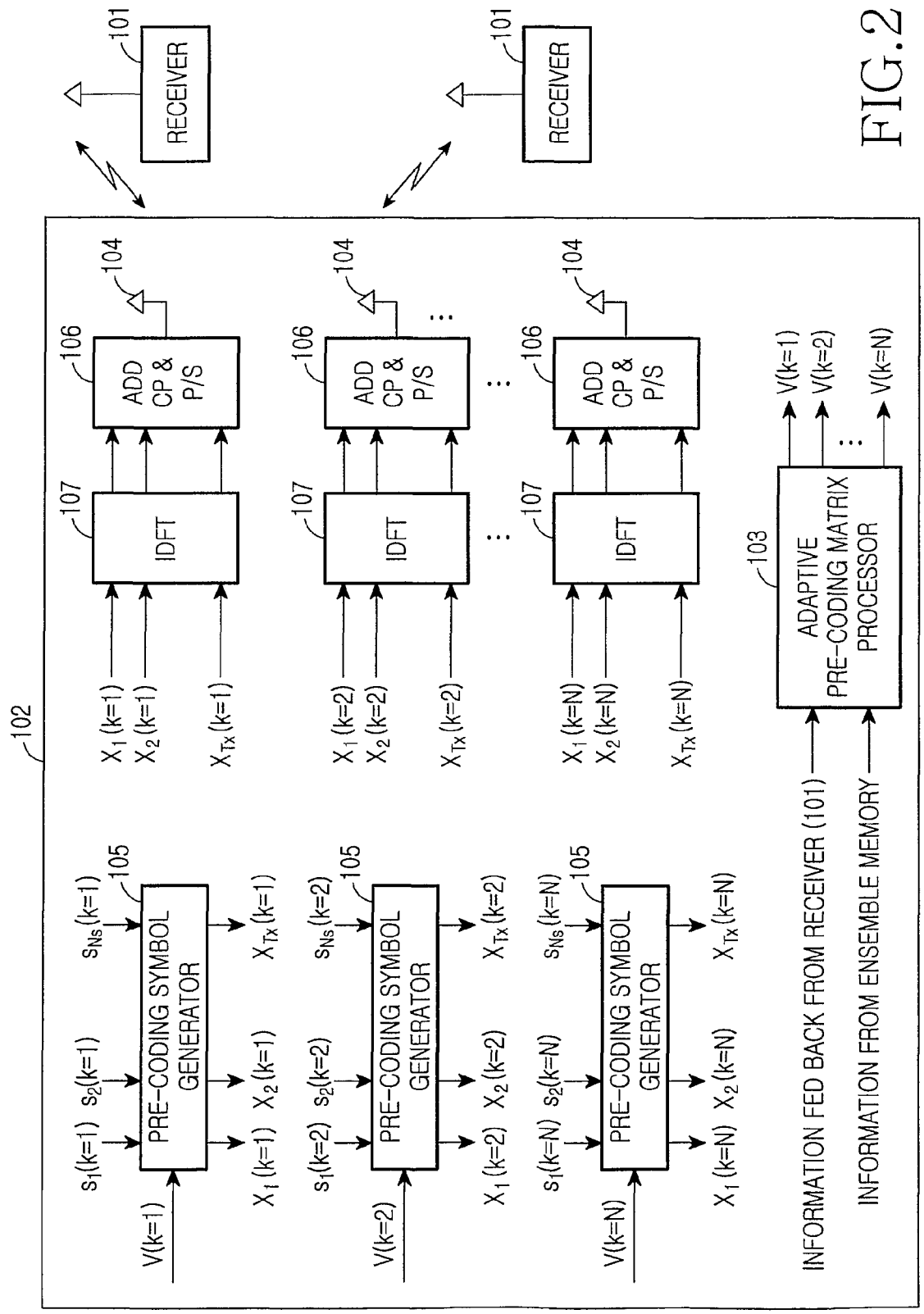
FIG. 2 shows a block diagram of processing at a transmitting end to which present invention can be applied.

At the transmitting end, as shown in FIG. 2, the system includes the following components.

FIG. 2 shows a block diagram of processing at a transmitting end to which present invention can be applied.

Figure 3:
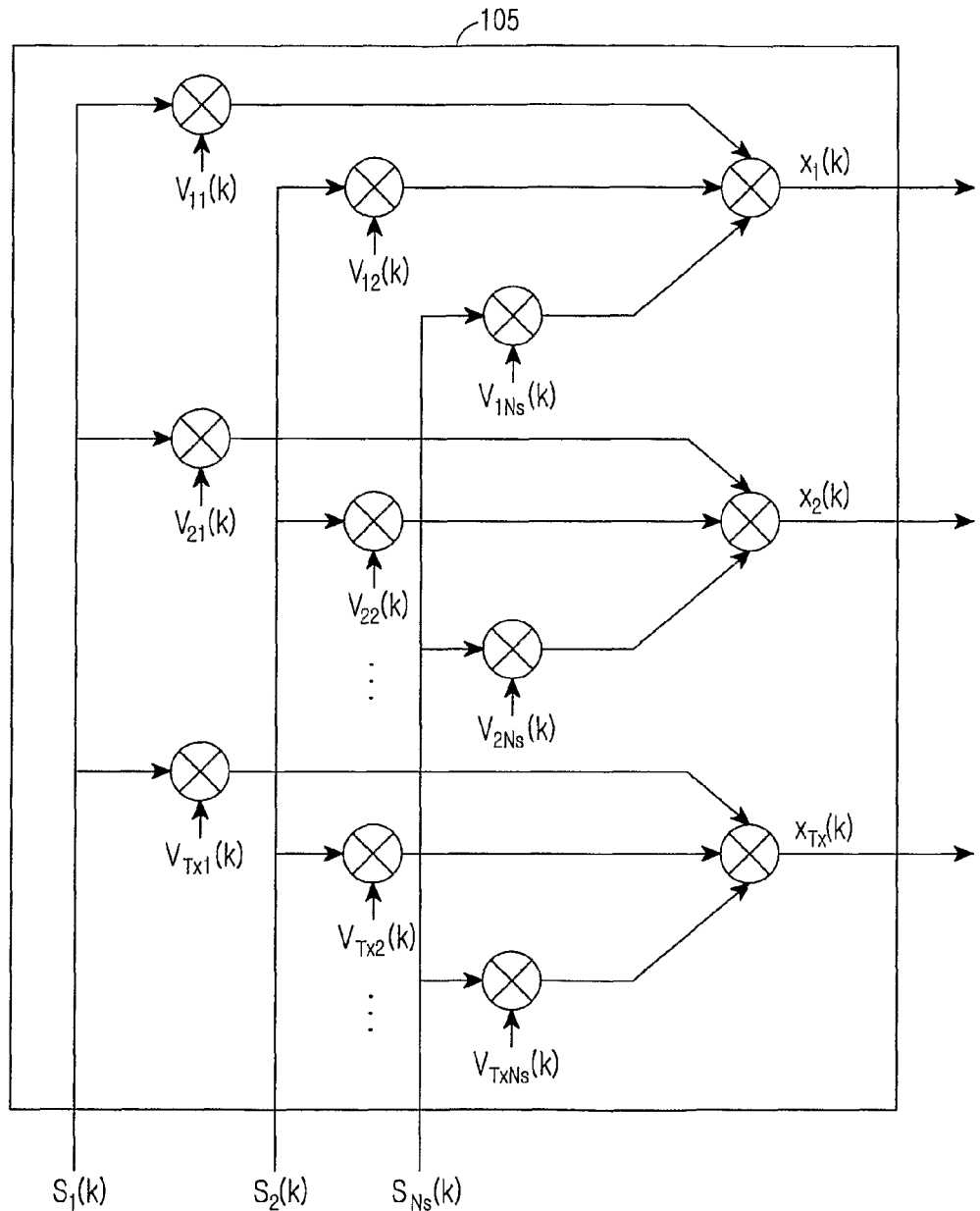
FIG. 3 shows a block diagram of a pre-coding symbol generator in a transmitting end to hitch present invention can be applied.

103: an adaptive pre-coding matrix processor, which reconstructs the pre-coding matrix for each sub-carrier according to channel information fed back from a receiver 102 and matrices saved in a local ensemble memory. For example, the pre-coding matrix can be generated through the method shown in FIG. 3 as described above.

104: transmitting antennas, which emits the power of RF (radio frequency) signals output from the radio transmitter in the form of electro-magnetic wave.

105: pre-coding symbol generators, which perform mapping process on the symbols on each sub-carrier before transmitting, according to the number $T_x$ of the transmitting antennas and the generated pre-coding matrices, so as to reduce the effect from the wireless channel to reception of useful symbols.

106: cyclic prefix and parallel-to-serial processing modules, which insert a cyclic prefix in the system and combine data streams.

107: a channel orthogonalizing modules, which are implemented in the receiving end generally by inverse discrete Fourier transform (IDFT). For example, the channel orthogonalizing modules can be formed as shown in FIG. 4.

Figure 4:
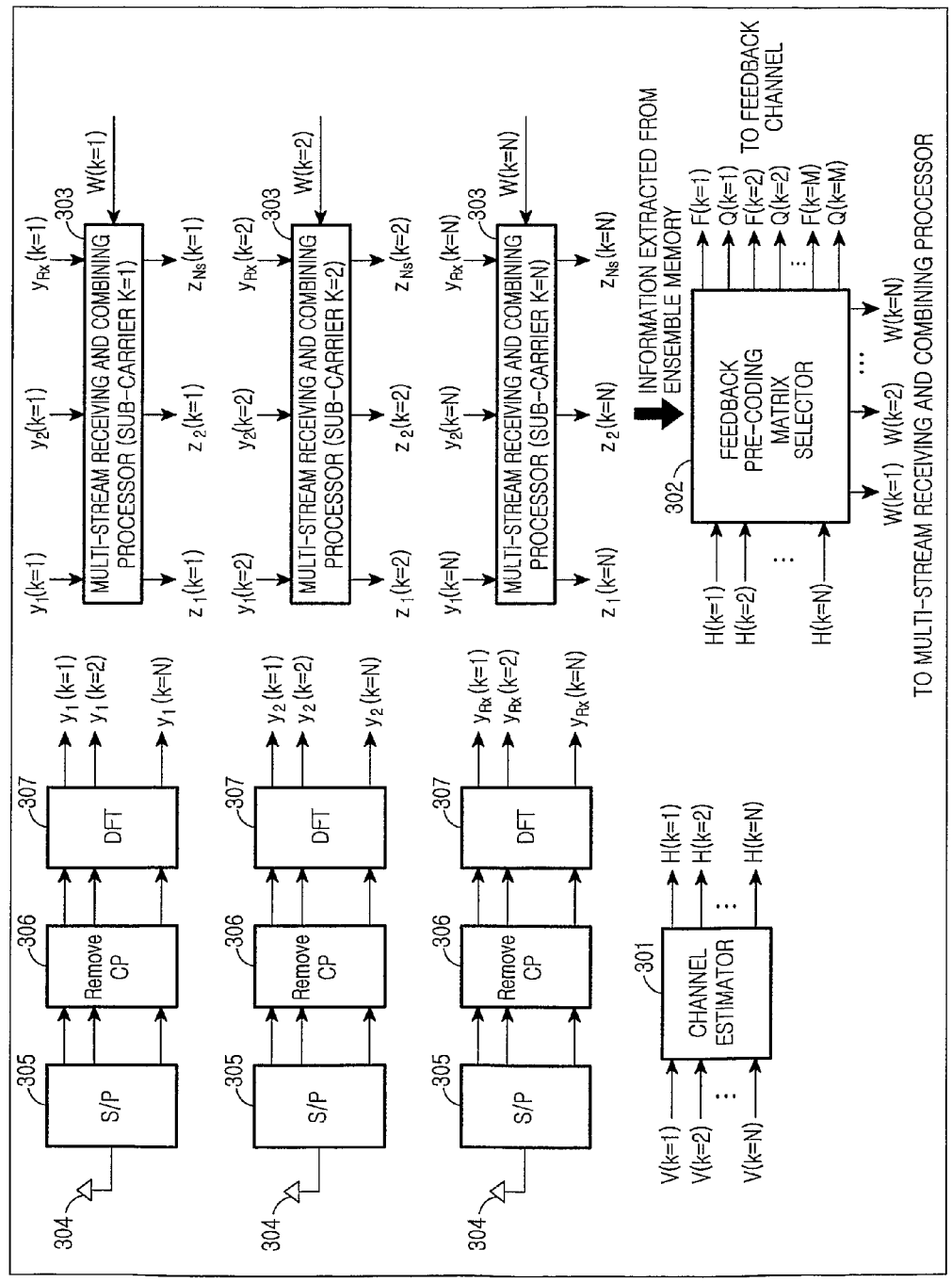
FIG. 4 shows a block diagram at a receiving end according to the present invention.

FIG. 4 shows a block diagram at a receiving end according to the present invention.

301: a channel estimator, which estimates channel response $H(k), (1 \leq k \leq N)$ at each sub-carrier in the frequency domain according to two-dimensional time-frequency pilot symbols transmitted from the transmitting end, where N denotes the number of the sub-carrier and k denotes the sub-carrier K.

302: a pre-coding matrix selector, which obtains channel response H(i) at each sub-carrier according to the information on the channel estimator 301 and then implements correlation between sub-carriers of an OFDM system and the Trellis method according to the matrix saved in the ensemble memory. For details of Trellis method, please refer to section 7 of "Principle and application of OFDM mobile communication technology", published by the People's Posts and Telecommunication Press, June, 2003. It selects the index of the pre-coding matrix F and the index of the interpolation rotation matrix Q and then feeds them back to the transmitting end.

Figure 5:
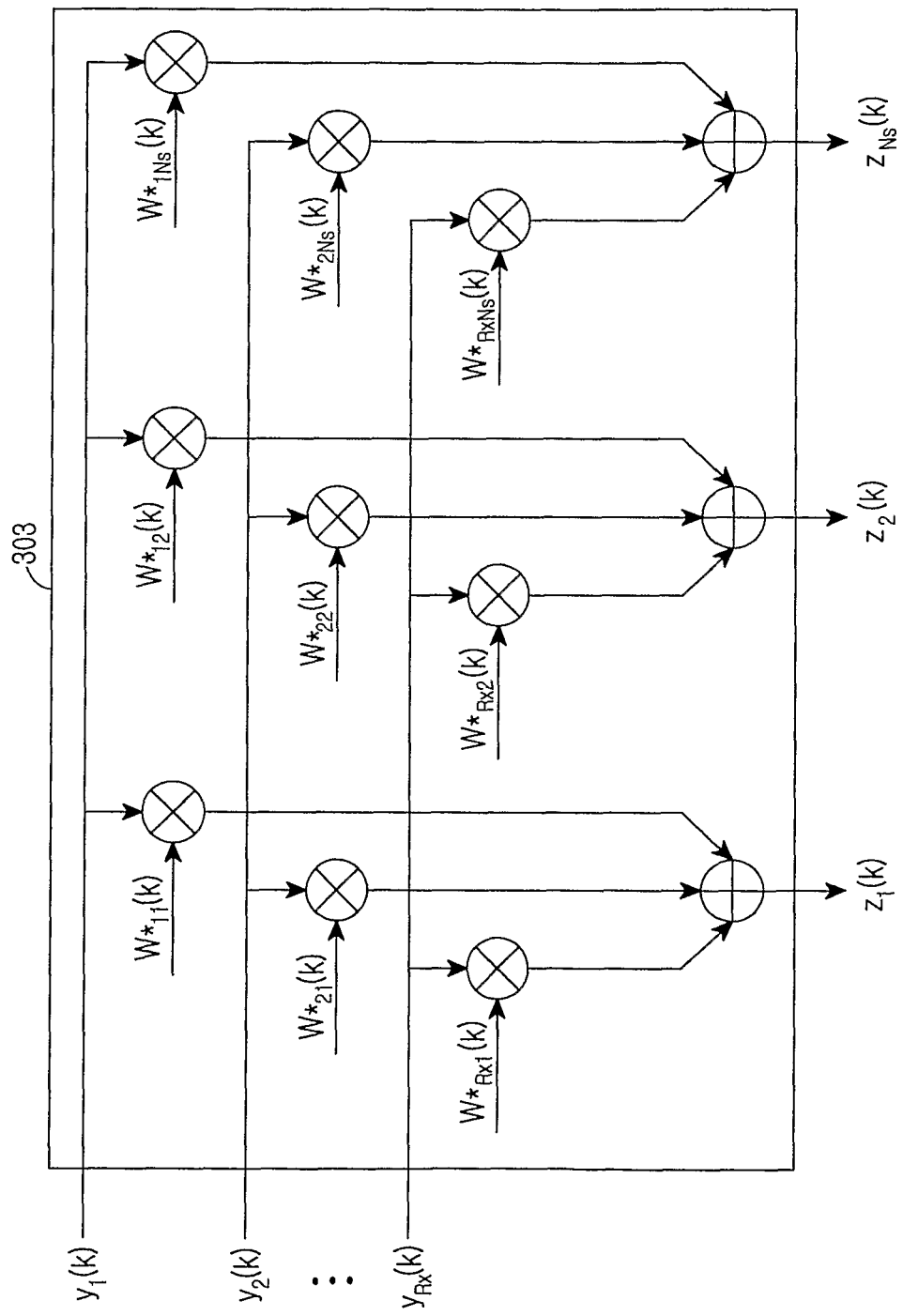
FIG. 5 shows a block diagram of a multi-stream receiving and combining processor (for sub-carrier k) in a receiving end according to the present invention.

303: multi-stream receiving and combining processors, as shown in FIG. 5, which weights and sums up the Rx pre-coded signals received via the Rx receiving antennas 304 to form the outputs of the multi-stream receiving and combining processor 303. The weight factor of stream j received via antenna m for sub-carrier k is $w_{m,j}(k)$. On the sub-carrier k, the $j^{th}$ output of the multi-stream receiving and combining processor 303 can be denoted as $z_j(k), (1 \leq j \leq N_s), (1 \leq k \leq N)$ (as shown in FIG. 5), where $$z_j(k) = \sum_{m=1}^{R_x} w_{m,j}(k) * y_m(k),$$

$(1 \leq j \leq N_s)$ and k is an index of subcarrier, $1 \leq k \leq N \cdot y_m(k)$ denotes the receiving symbol in the subcarrier k which is received via antenna m.

304: receiving antennas, which convert the received electro-magnetic wave signal into RF signal power for the transmitter.

305: serial-to-parallel convertors, which sample the input data to maps the serial data into parallel data.

306: cyclic prefix processors, which remove the cyclic prefix for the system.

Figure 6:
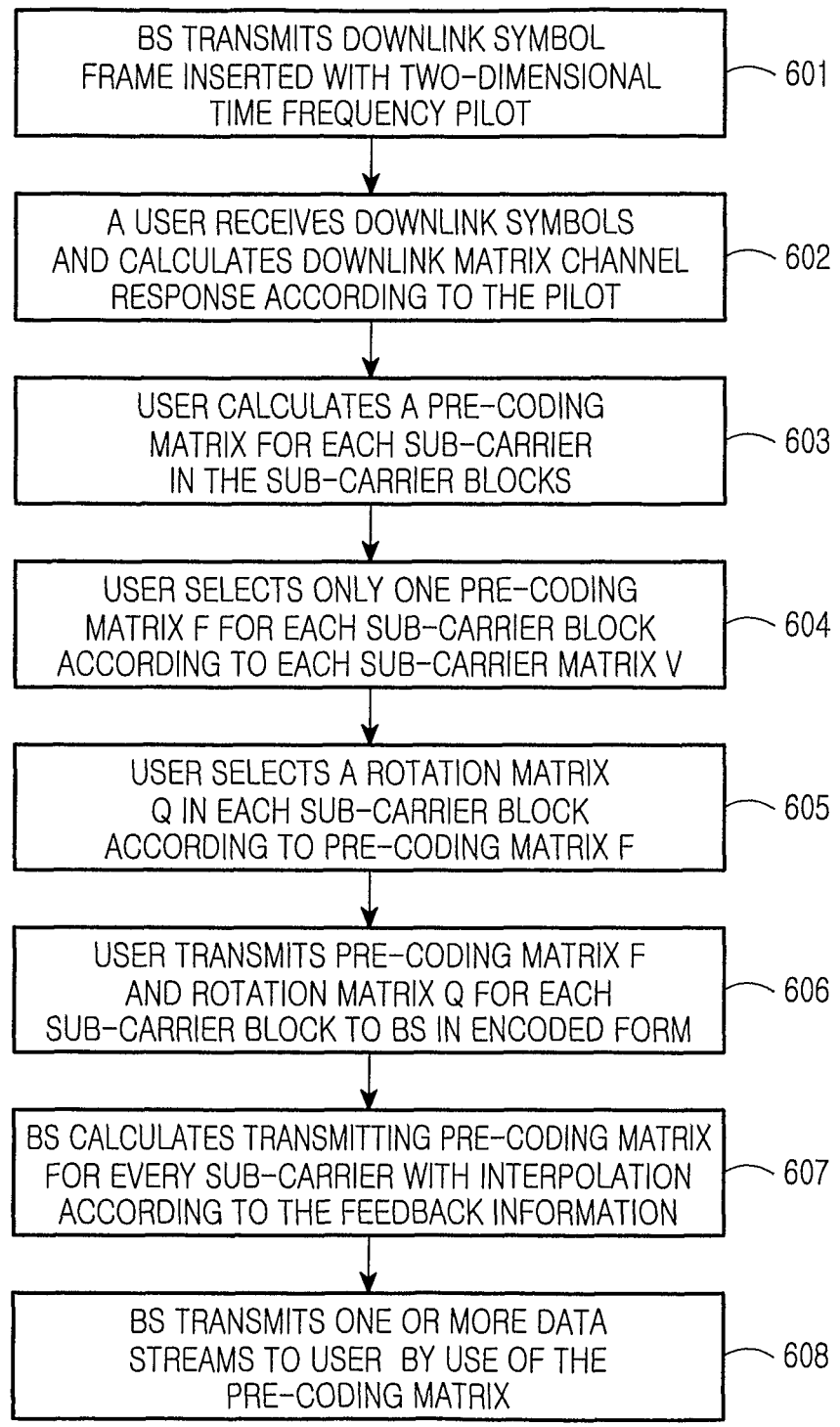
FIG. 6 shows a flowchart of pre-coding according to the present invention.

307: channel de-orthogonalizing modules, which are generally realized by discrete Fourier transform (DFT);

A method for transmission in an MIMO OFDM/OFDMA system is proposed in present invention. As illustrated in FIG. 6, the method according to the present invention includes the steps:

Step 601: BS transmits downlink symbol frame inserted with two-dimensional time frequency pilot.

Step 602: the receiver receives signals of multiple sub-carriers and calculates downlink matrix channel according to pilot. Then step 603 according to the correlation between adjacent sub-carriers, it divides the received sub-carriers into several sub-carrier blocks with each containing K sub-carriers and calculate the matrix V(i) for each subcarrier; step 604 with the Trellis method and the maximum capacity criterion, it selects a Tx×$N_s$-dimensional matrix F(i) (feedback sub-carrier pre-coding matrix) for each sub-carrier block i; and step 605 by relevant criteria and the selected matrix F(i), it selects a Tx×Tx-dimensional rotation matrix Q(i) for each sub-carrier block, and Tx denotes the antennas number in transmitter side. Then, in step 606 it feeds the information on the pre-coding matrix and the rotation matrix for each sub-carrier block back to the transmitter.

Step 607: The transmitter recovers the pre-coding matrix for each sub-carrier according to the obtained information of the pre-coding matrix index and the information of the rotation matrix index and the matrices saved in the ensemble memory for step 608 transmitting downlink data frames.

The receiving end according to the present invention further includes means comprising a feedback pre-coding matrix selector 302. The selector 302 has multiple sub-carrier channel responses and the ensemble memory as its input. The selector 302 outputs a plurality of Tx×Ns-dimensional pre-coding matrices F and rotation matrices Q, wherein a pre-coding matrix and a rotation matrix are calculated for each sub-carrier block containing multiple sub-carriers.

The transmitting end 102 according to the present invention further includes means comprising a pre-coding matrix processor 103. The processor 103 has the feedback channel information and the ensemble memory as its input. The processor 103 outputs a regenerated Tx×Ns-dimensional pre-coding matrix V(k) for each sub-carrier k.

The present invention also provides an optimized method for selecting feedback pre-coding matrix, which comprising the following steps:

the receiver receives signals of multiple sub-carriers and estimates the channel response H(k) for each sub-carrier in the frequency domain; then, based on the Trellis method, the receiver selects a set of pre-coding matrices {F(i)},(0≦i≦N/K−1) (K indicates the size of a sub-carrier block, i indicates the sub-carrier block index, N denotes the number of subcarrier that meets the requirement of maximum system capacity from V(k)(1≦k≦N) and guarantees that the frequency interval between two adjacent pre-coding matrices equals to the size of the corresponding sub-carrier block.

The present invention also provides an optimized method for selecting feedback rotation matrix Q. This method comprises the following steps:

according to the calculated set of feedback pre-coding matrices {F(i)},(0≦i≦N/K−1) and the MSE criterion, the receiver selects rotation matrices $Q(i)_{i=0}^{N/K-1}$ for the respective sub-carrier block from the ensemble for each sub-carrier block by use of spatial interpolation.

The present invention also provides a pre-coding matrix estimation method at the transmitting end. This method comprises the following steps:

the transmitter obtains {F(i)},(0≦i≦N/K−1) and $Q(i)_{i=0}^{N/K-1}$ according to the pre-coding matrix indices and the rotation matrix indices fed back from the receiver and the ensemble memory, and uses spatial interpolation to calculate a pre-coding matrix $\overline{V}(k)$,(1≦k≦N) at each sub-carrier as indicated in the formula below $$Z(iK+k) = (1-c_k)F(i) + c_k Q(i)F(i+1)$$

$$(1 \le k \le K, 0 \le i \le N_c/K - 1)$$

$$\overline{V}(iK+k) = Z(iK+k)\{Z^H(iK+k)Z(iK+k)\}^{-\frac{1}{2}};$$

Where $\overline{V}$(iK+k) denotes the precoding matric using for kth sub-carrier in the ith subcarrier-block and K is the subblock size. Then the data to be transmitted is pre-processed with the recovered pre-coding matrix at each sub-carrier.

Figure 1:
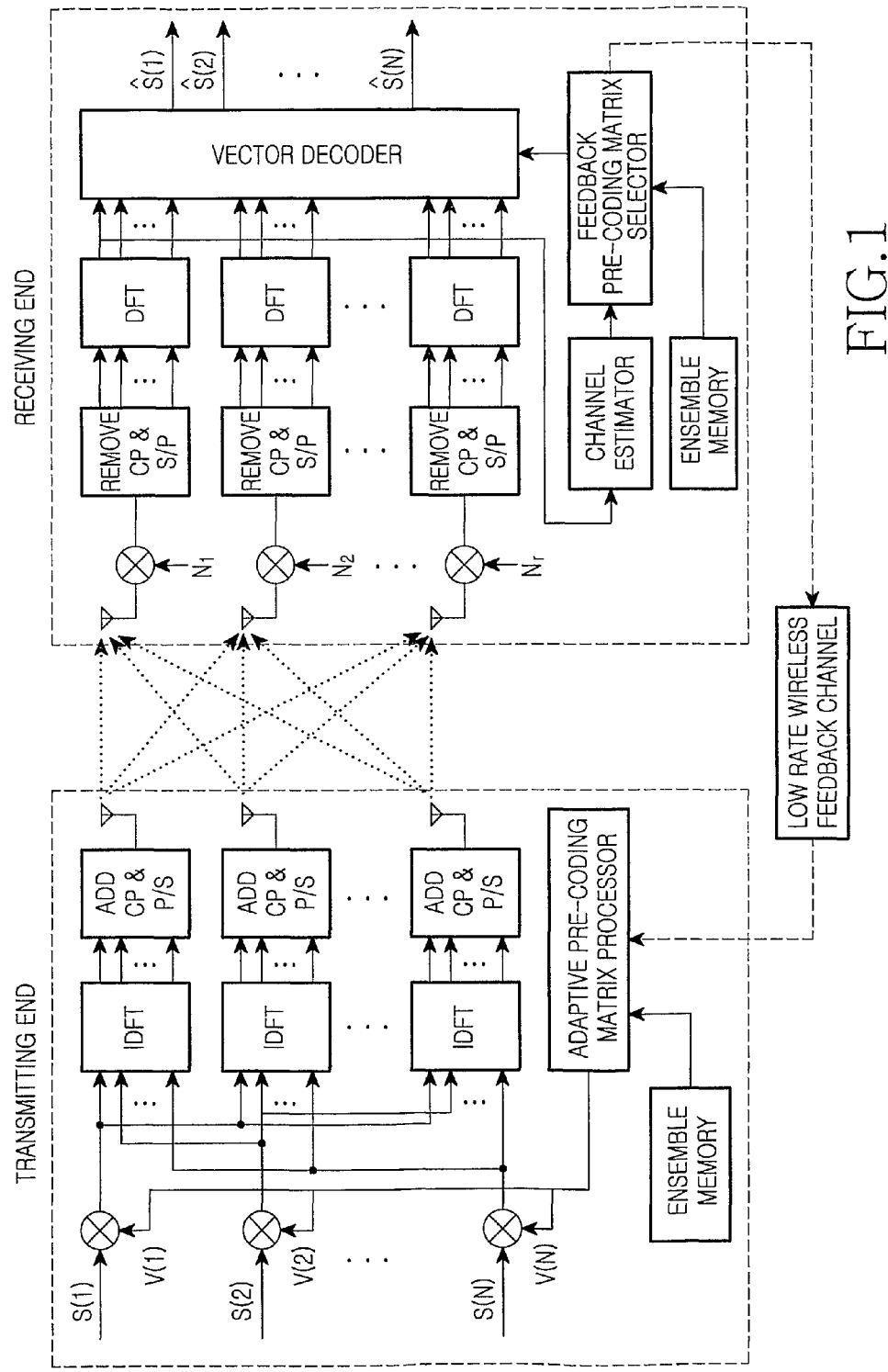
FIG. 1 shows a block diagram of a pre-coding system in an MIMO multi-carrier system to which present invention can be applied.

An OFDM/OFDMA system similar to that illustrated in FIG. 1 is adopted in the preferred embodiments of the present invention. However, in alternative embodiments of the present invention, systems of other communication protocols can be adopted. Such protocol-based systems include multi-carrier CDMA system. Therefore, the present invention is applicable and effective for the OFDM/OFDMA system, the multi-carrier CDMA as well as any other similar or hybrid system.

In order to avoid the necessity of feeding back a different V(k) for each OFDM sub-carrier k, the frequency domain is firstly divided into a plurality of sub-carrier blocks each containing K sub-carriers in the present preferred embodiment. For each sub-carrier block containing K sub-carriers, only one pre-coding matrix F and one rotation matrix Q are provided to the transmitting end for use across the K sub-carriers.

Suppose that the number of sub-carriers in the overall system is N. In this embodiment, N=24, for example. The size of a sub-carrier block is K. In this embodiment, K=8, for example. A BS (base station) has Tx transmitting antennas, and An MS (mobile station) has Rx receiving antennas. In this embodiment, Tx=4, Rx=2, for example. Each sub-carrier carries $N_s$ streams. In this embodiment, $N_s$=2, for example. The cyclic prefix is L long. In this embodiment, L=16, for example. The modulation scheme QPSK is applied at the transmitting end. The size of the ensemble of pre-coding matrices is 64, i.e., $\log_2 64=6$ bits are required, {V(1), ..., V(64)}. The size of the ensemble of rotation matrices is 4, i.e., $\log_2 4=2$ bits are required, {Q(1), ..., Q(4)}. The transmitting power of the BS is uniformly distributed on all the sub-carriers. No channel coding is applied at the transmitting end 102. And ITU Vehicular Model B is adopted as channel model. In the description, V(1) denotes the first precoding matrix in the ensemble; V(2) denotes the second precoding matrix; ...; and V(64) denotes a $64^{th}$ precoding matrix. Q(1) denotes the first rotation matrix; Q(2) denotes the second rotation matrix; ... Q(64) denotes the $4^{th}$ rotation matrix.

Figure 7:
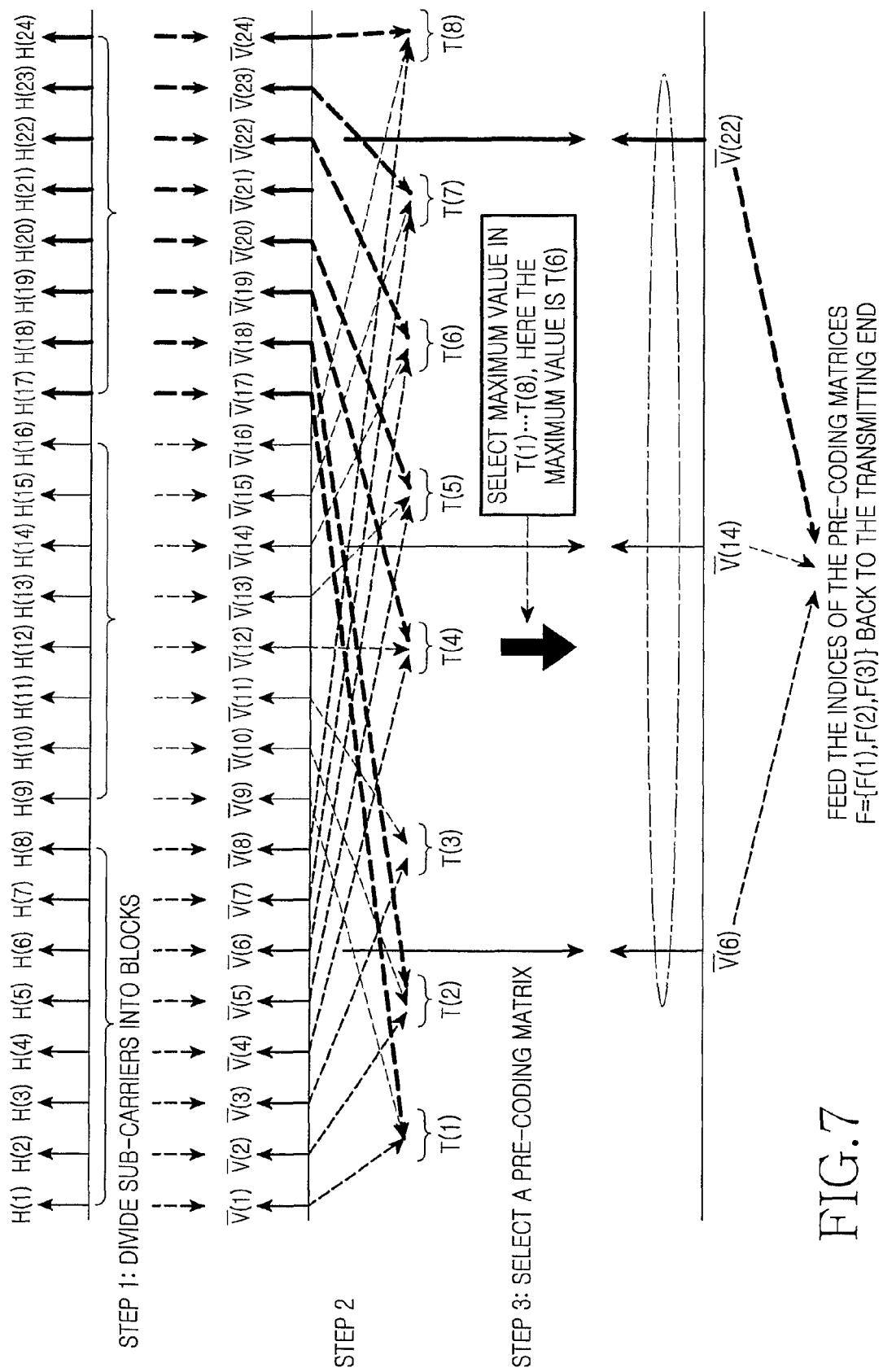
FIG. 7 shows a flowchart for selecting a feedback pre-coding matrix according to the present invention.

As shown in FIG. 7, the receiver estimates the frequency-domain responses $\{H(l)\}_{l=2}^{24}$ of channels between the receivers and the transmitter according to the two-dimensional time-frequency pilot signals. According to specific criterion and the obtained frequency-domain channel response H(l) on each sub-carrier, the receiver selects a feedback pre-coding matrix $\overline{V}$(l) for each sub-carrier from the ensemble memory. Here, the specific criterion includes but not limited to MSE (Mean Square Error) criterion. In this embodiment, the MSE criterion (expression 1) is adopted to select the feedback pre-coding matrices $\{\overline{V}(l)\}_{l=1}^{24}$ for the respective sub-carriers (step 2 in FIG. 7):

$$\overline{V}(l) = \min_{1 \le n \le 64} \left\{ tr \left\{ \frac{\varepsilon_s}{M_s} \left\{ I_{M_s} + \frac{\varepsilon_s}{M_s N_0} V^H(n) H^H(l) H(l) V(n) \right\}^{-1} \right\} \right\},$$
$$1 \le l \le 24$$

(expression 1)

$\varepsilon_s$ is the symbol energy of transmission and $M_s$ represents the minimum of transmitting antenna numbers and receiving antenna numbers; min (x) denotes an operator of minimum (x); $N_0$ denotes a noise variance; H(l) denotes channel response matrix of subcarrier index l; $H^H$ denotes the hermitian conversion of the H matrix; l denotes the sub-carrier index, $V^H(k)$ denotes the hermitian conversion of the V(k) matrix; n denotes the index of the ensemble of pre-coding matrices.

The sub-carriers are divided into blocks at an interval of K=8 sub-carriers to obtain three blocks in total.

With the Trellis method, a set of pre-coding matrices are selected with an interval of the size (K=8) of a sub-carrier block and a purpose of meeting the requirement of maximum system capacity. The Trellis method is used here to reach maximum throughput for the overall system. Those skilled in the art can understand that other methods could be adopted to select the pre-coding matrix if there is any other purpose, such as to maximize the system capacity. A specific method of selecting the pre-coding matrix is illustrated in step 3 in FIG. 7:

firstly, parameters T(k) are calculated for each set of pre-coding matrices:

$$T(k) = \sum_{i=0}^{2} \lambda_{min} \{ H(k + iK) \overline{V}(k + iK) \},$$
$$(1 \le k \le 8, K = 8)$$

(expression 2)

$\lambda_{min}\{\}$ denotes the minimum value among eigenvalues of the matrices;

then, the set of pre-coding matrices corresponding to the maximum value is selected from the set $\{T(k)\}(1 \le k \le 8)$ as the set of pre-coding matrices $\{F(i)\}(0 \le i \le 2)$ to be fed from the receiver back to the transmitter, i is an index of sub-carrier blocks. In this embodiment, if k=6, the corresponding pre-coding matrix set is $\{\overline{V}(6), \overline{V}(14), \overline{V}(22)\}$, H(k+iK) denotes the channel matrix of k th sub-carrier in the i th subcarrier-block and K is the subblock size.

For convenience of description, let F denote this set. The relationship between them is F={F(1),F(2),F(3)}, where F(i)=$\overline{V}$(6+8(i−1)),(1≤i≤3) (as shown in FIG. 7).

Since only Euclid linear interpolation is implemented at the transmitting end, neither orthogonality among the columns of each pre-coding matrix nor the uniqueness in the ensemble space (Grassmann manifold) can be guaranteed. A rotation matrix Q is also fed back for each sub-carrier block, so that the rotation matrix can be used by the transmitter in linear interpolation processing to recover the pre-coding matrix at each sub-carrier. Since the selection of the rotation matrix for each sub-carrier block is independent of that for another sub-carrier block, the operation of selecting rotation matrix for sub-carrier block 1 is explained as an example.

Figure 8:
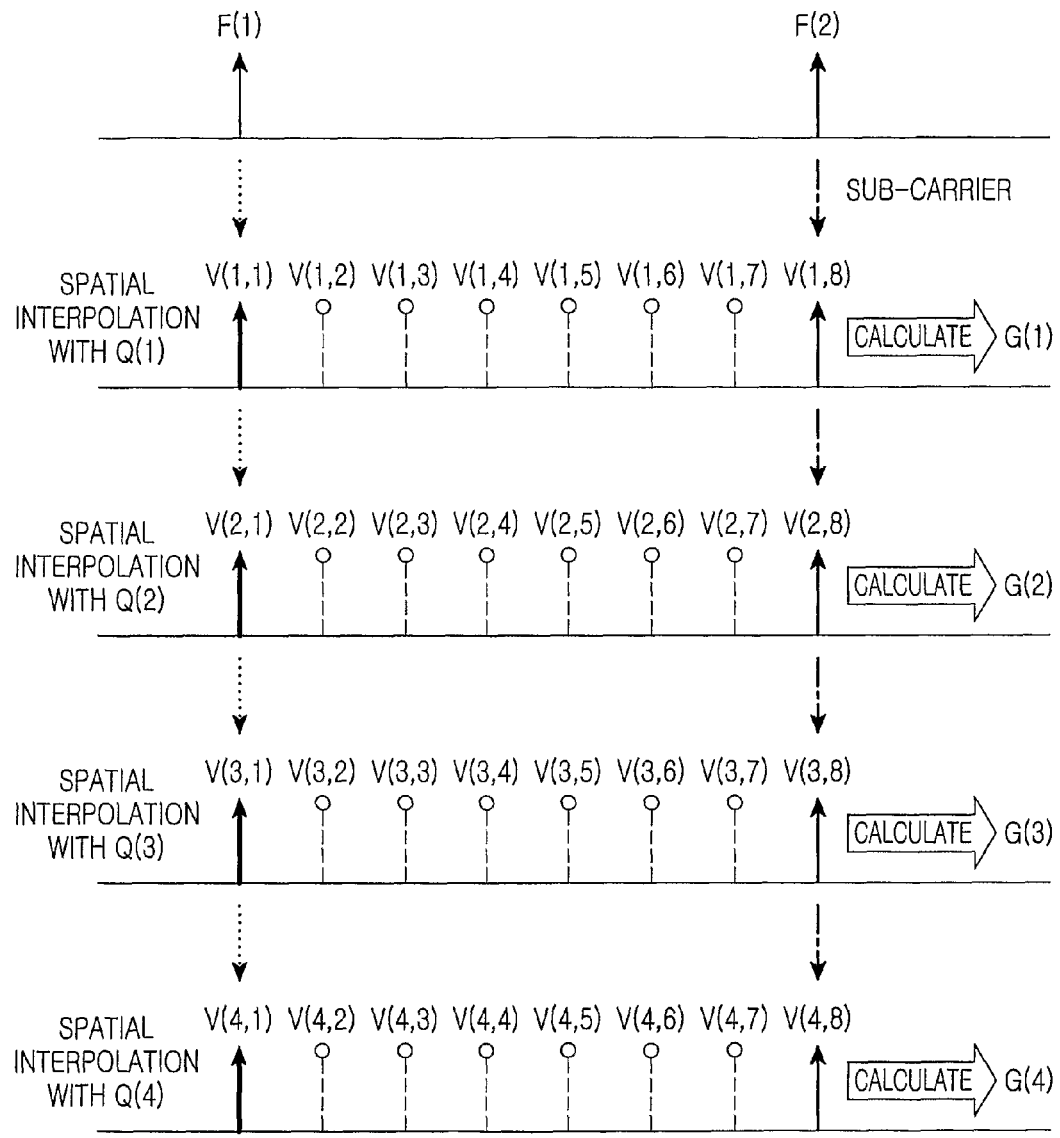
FIG. 8 shows a flowchart for selecting a rotation matrix according to the present invention.

As shown in FIG. 8, Q(1), Q(2), Q(3), Q(4) are extracted sequentially from the rotation matrix ensemble, and G(1),G(2),G(3),G(4) are calculated according to expressions (3~5):

$$Z(iK + k) = (1 - c_k)F(i) + c_k Q(i)F(i + 1)$$
$$(1 \le k \le 8, 0 \le i \le 2)$$

(expression 3)

$$\hat{V}(iK + k, \overline{Q}) = Z(iK + k)\{Z^H(iK + k)Z(iK + k)\}^{-\frac{1}{2}}$$

(expression 4)

$$G(k) = \max tr\left( MSE\left( \hat{V}(iK + k, \overline{Q}) \right) \right)$$

(expression 5)

where, $$MSE(\hat{V}(k, \overline{Q})) = \frac{\varepsilon_s}{M_s}$$
$$\left\{ I_{M_s} + \frac{\varepsilon_s}{M_s N_0} \hat{V}^H(k, \overline{Q}) H^H(k) H(k) \hat{V}(k, \overline{Q}) \right\}^{-1}$$

$$c_k = k - 1/K, (1 \le k \le K).$$

$\varepsilon_s$ is the symbol energy of transmission and $M_s$ represents the minimum of transmitting antenna numbers and receiving antenna numbers, i denotes the index of the sub-carrier blocks. I($M_s$) denotes a unit matric, which dimension is $M_s$. $c_k$ denotes a coefficient using for k th block interpolation and max tr denotes maximum of matrix trace. $N_0$ denotes noise variance; H(k) denotes channel response matrix of subcarrier index k; $H^H$ denotes the hermitian conversion of the H matrix; k denotes the sub-carrier index, $V^H(k)$ denotes the hermitian conversion of the V(k) matrix.

The index of the minimum value among $\{G(l)\}, 1 \le l \le 4$ is selected. In this embodiment, the index corresponding to the minimum value is 3. Therefore, Q(3) is selected as the rotation matrix for the sub-carrier block to be fed back to the transmitting end.

With the method described above, respective rotation matrices for the three sub-carrier blocks are sequentially selected. In this embodiment, the matrices selected for the three sub-carrier blocks are Q(3), Q(2), Q(1) respectively.

Then, the indices of the pre-coding matrices {F(i)} (1≤i≤3) and the rotation matrices {Q(i)}(1≤i≤3) are fed back to the transmitting end in the format illustrated in FIG. 9. In this embodiment, 6×3+2×3=24 bits in total are needed. However, if it is necessary to feed back a pre-coding matrix back for each sub-carrier to the transmitting end, 6*24=144 bits are needed. Thus, the number of bits to be fed back can be greatly reduced with the present invention.

At the transmitting end, the pre-coding matrices $\{\hat{V}(k, \overline{Q})\}_1^{24}$ are recovered for the respective sub-carriers according to the indices of the pre-coding matrices and the rotation matrices fed back from the receiving end by use of spatial Interpolation as follows:

$$Z(iK + k) = (1 - c_k)F(i) + c_k Q(i)F(i + 1)$$
$$(1 \le k \le 8, 0 \le i \le 2)$$

$$\hat{V}(iK + k, \overline{Q}) = Z(iK + k)\{Z^H(iK + k)Z(iK + k)\}^{-\frac{1}{2}}$$

Data to be transmitted are processed with the pre-coding matrix $\hat{V}(k, \overline{Q})$ on each sub-carrier obtained through the above spatial Interpolation so as to improve the system performance.

What is claimed is:

1. A signal processing method in an MIMO multi-carrier system, the method comprising:
 receiving, by a receiver, signals of a plurality of sub-carriers transmitted from a transmitter;
 dividing the sub-carriers into a plurality of sub-carrier blocks according to the correlation between adjacent sub-carriers, each sub-carrier block containing K sub-carriers;

selecting a feedback sub-carrier pre-coding matrix (F(i)) and a rotation matrix (Q(i)) for each sub-carrier block$^i$, and then sending information on the pre-coding matrix and the rotation matrix back to the transmitting end, wherein the selecting of the rotation matrix comprises:
extracting the rotation matrices Q(i),(1≦i≦M) one-by-one from a rotation matrix ensemble, M denoting the size of the rotation matrix ensemble.

2. The method of claim 1, wherein said information on the pre-coding matrix and the rotation matrix includes an index of the pre-coding matrix and an index of the rotation matrix.

3. The method of claim 1, wherein the feedback sub-carrier pre-coding matrix (F(i)) is selected for each sub-carrier block$^i$ to maximize the system capacity.

4. The method of claim 3, wherein the feedback sub-carrier pre-coding matrix (F(i)) is selected according to the formula:

$$\{F(i)\}_{i=0}^{N/K-1} = \max_{1 \le k \le K} \sum_{i=0}^{N/K-1} \lambda_{min}\{H(k+iK)\overline{V}(k+iK)\}$$

$\lambda_{min}\{\ \}$ denotes obtaining the minimum value among eigenvalues of the matrix, H(k+iK) denotes the response of the channel between the transmitter and the receiver for sub-carrier k in the sub-carrier block i, $\overline{V}$(k+iK) denotes a value in an ensemble corresponding to H(k+iK), i denotes the index of sub-carrier blocks,
k: denotes the sub-carrier index in the sub-carrier block,
K denotes the size of the sub-carrier block,
N denotes the total number of the sub-carriers.

5. The method of claim 1, wherein the rotation matrix Q(i) is selected so as to minimize the channel influence and to maximize the system capacity.

6. The method of claim 1, wherein the selecting of the rotation matrix further comprises:
selecting the rotation matrix according to a following formula by selecting the rotation matrix corresponding to the minimum value of G(k) as the rotation matrix for the current sub-carrier block:

$$Z(iK+k) = (1-c_k)F(i) + c_k Q(i)F(i+1)$$

$$\left(1 \le k \le K, 0 \le i \le \frac{N}{K}-1\right)$$

$$\hat{V}(iK+k, \overline{Q}) = Z(iK+k)\{Z^H(iK+k)Z(iK+k)\}^{-\frac{1}{2}}$$

$$G(k) = \max tr\left(MSE(\hat{V}(iK+k, \overline{Q}))\right)$$

where $$MSE(\hat{V}(k, \overline{Q})) = \frac{\varepsilon_s}{M_s}\left\{I_{M_s} + \frac{\varepsilon_s}{M_s N_0}\hat{V}^H(k, \overline{Q})H^H(k)H(k)\hat{V}(k, \overline{Q})\right\}^{-1}$$

$$c_k = k - 1/K, (1 \le k \le K);$$

$\varepsilon_s$ is the symbol energy of transmission and $M_s$ represents the minimum of transmitting antenna numbers and receiving antenna numbers; i denotes the index of the sub-carrier blocks; $I(M_s)$ denotes a unit matric, which dimension is $M_s$; k denotes the sub-carrier index in the sub-carrier block; $c_k$ denotes a coefficient using for k th block interpolation and max tr denotes maximum of matrix trace; $H^H$ denotes the hermitian conversion of the H matrix; $\hat{V}^H$ denotes the hermitian conversion of the $\hat{V}$ matrix.

7. The method of claim 1, further comprising:
receiving by the transmitter the information on the pre-coding matrix and the rotation matrix;
recovering the pre-coding matrices for the respective sub-carriers by use of the received information; and
weighting all the sub-carriers with the recovered pre-coding matrices.

8. The method of claim 7, wherein the recovering of the pre-coding matrices for the respective sub-carriers in the transmitting end includes: calculating the pre-coding matrices for the respective sub-carriers by spatial interpolation according to the pre-coding matrix F and the rotation matrix Q fed back from the receiving end, so as to minimize the error between the recovered pre-coding matrix and the actual pre-coding matrix.

9. The method of claim 8, wherein the recovered pre-coding matrix $\hat{V}$(k),(1≦k≦N) is calculated with the formula $$Z(iK+k) = (1-c_k)F(i) + c_k Q(i)F(i+1)$$

$$\left(1 \le k \le K, 0 \le i \le \frac{N}{K}-1\right)$$

$$\hat{V}(iK+k) = Z(iK+k)\{Z^H(iK+k)Z(iK+k)\}^{-\frac{1}{2}}$$

i: denotes the index of sub-carrier blocks,
k: denotes the sub-carrier index in the sub-carrier block,
K denotes the size of the sub-carrier block,
N denotes the total number of the sub-carriers;
$Z^H$ denotes the hermitian conversion of the Z matrix.

10. A signal processing device at a receiving end comprising:
receiver for receiving signals of a plurality of sub-carriers transmitted from a transmitter;
a feedback pre-coding matrix selector for dividing the sub-carriers into a plurality of sub-carrier blocks according to the correlation between adjacent sub-carriers, each sub-carrier block containing K sub-carriers, selecting a feedback sub-carrier pre-coding matrix (F(i)) and a rotation matrix (Q(i)) for each sub-carrier block$^i$, and then sending information on the pre-coding matrix and the rotation matrix back to the transmitting end,
wherein the feedback pre-coding matrix selector is extracted the rotation matrices Q(i),(1≦i≦M) one-by-one from a rotation matrix ensemble, M denoting the size of the rotation matrix ensemble.

11. The device of claim 10, wherein said information on the pre-coding matrix and the rotation matrix includes an index of the pre-coding matrix and an index of the rotation matrix.

12. The device of claim 10, wherein the feedback sub-carrier pre-coding matrix (F(i)) is selected for each sub-carrier block$^i$ to maximize the system capacity.

13. The device of claim 12, wherein the feedback pre-coding matrix selector selects the pre-coding matrix with the formula $$\{F(i)\}_{i=0}^{N/K-1} = \max_{1 \le k \le K} \sum_{i=0}^{N/K-1} \lambda_{min}\{H(k+iK)\overline{V}(k+iK)\}$$

$\lambda_{min}\{\ \}$ denotes obtaining the minimum value among eigenvalues of the matrix, H(k+iK) denotes the response of the channel between the transmitter and the receiver for sub-carrier k in the sub-carrier block i, $\overline{V}(k+iK)$ denotes a value in an ensemble corresponding to H(k+iK), k denotes the index of sub-carrier, i: denotes the sub-carrier index in the sub-carrier block, K denotes the size of the sub-carrier block, N denotes the total number of the sub-carriers.

14. The device of claim 10, wherein the feedback precoding matrix selector selects the rotation matrix Q(i) so as to minimize the channel influence and to maximize the system capacity.

15. The device of claim 10, wherein the feedback precoding matrix selector selects the rotation matrix according to the formula by selecting the rotation matrix corresponding to the minimum value of G(k) as the rotation matrix for the current sub-carrier block;

$$Z(iK+k) = (1-c_k)F(i) + c_k Q(i)F(i+1)$$
$$\left(1 \leq k \leq K, 0 \leq i \leq \frac{N}{K}-1\right)$$

-continued $$\hat{V}(iK+k, \overline{Q}) = Z(iK+k)\{Z^H(iK+k)Z(iK+k)\}^{-\frac{1}{2}}$$

$$G(k) = \max tr(MSE(\hat{V}(iK+k, \overline{Q})))$$

where $$MSE(\hat{V}(k, \overline{Q})) = \frac{\varepsilon_s}{M_s}\left\{I_{M_s} + \frac{\varepsilon_s}{M_s N_0}\hat{V}^H(k, \overline{Q})H^H(k)H(k)\hat{V}(k, \overline{Q})\right\}^{-1}$$

$$c_k = k - 1/K, (1 \leq k \leq K);$$

$\epsilon_s$ is the symbol energy of transmission and $M_s$ represents the minimum of transmitting antenna numbers and receiving antenna numbers; i denotes the index of the sub-carrier blocks; $I(M_s)$ denotes a unit matric, which dimension is $M_s$; k denotes the sub-carrier index in the sub-carrier block; $c_k$ denotes a coefficient using for k th block interpolation and max tr denotes maximum of matrix trace; $H^H$ denotes the hermitian conversion of the H matrix; $\hat{V}^H$ denotes the hermitian conversion of the $\hat{V}$ matrix.

* * * * *